(12) United States Patent
Tanach

(10) Patent No.: US 9,113,415 B2
(45) Date of Patent: *Aug. 18, 2015

(54) IDLE STATE MANAGEMENT

(75) Inventor: Moshe Tanach, Kiriat Motzkin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,263

(22) Filed: Jun. 26, 2012

(65) Prior Publication Data

US 2012/0269106 A1 Oct. 25, 2012

Related U.S. Application Data

(63) Continuation of application No. 11/018,561, filed on Dec. 21, 2004.

(51) Int. Cl.
*H04W 52/02* (2009.01)
*H04W 24/00* (2009.01)

(52) U.S. Cl.
CPC ...... *H04W 52/0238* (2013.01); *H04W 52/0232* (2013.01); *H04W 24/00* (2013.01)

(58) Field of Classification Search
CPC .................. H04W 52/0238; H04W 52/0232; H04W 24/00
USPC ......... 370/311, 345, 445, 461, 469, 474, 316, 370/329, 338, 352, 389, 346; 455/574
See application file for complete search history.

(56) References Cited

U.S. PATENT DOCUMENTS

| | | | |
|---|---|---|---|
| 6,304,756 B1 | 10/2001 | Hebeler et al. | |
| 7,359,459 B2 | 4/2008 | Shvodian | |
| 7,522,669 B2 | 4/2009 | Husted | |
| 7,813,414 B2 * | 10/2010 | Lewis | 375/219 |
| 7,821,976 B2 * | 10/2010 | Kim et al. | 370/311 |
| 2002/0163933 A1 | 11/2002 | Benveniste | |
| 2004/0196834 A1 * | 10/2004 | Ofek et al. | 370/352 |
| 2004/0198302 A1 | 10/2004 | Hutchison et al. | |
| 2004/0235439 A1 * | 11/2004 | Husted et al. | 455/136 |
| 2005/0026639 A1 * | 2/2005 | Lewis | 455/509 |
| 2005/0036571 A1 | 2/2005 | Shvodian et al. | |
| 2005/0130713 A1 | 6/2005 | Simpson et al. | |
| 2005/0169261 A1 * | 8/2005 | Williams et al. | 370/389 |
| 2005/0226270 A1 * | 10/2005 | Liu et al. | 370/469 |
| 2005/0232370 A1 * | 10/2005 | Trachewsky et al. | 375/267 |

(Continued)

FOREIGN PATENT DOCUMENTS

| | | |
|---|---|---|
| WO | 0122663 | 3/2001 |
| WO | 0162028 | 8/2001 |

(Continued)

OTHER PUBLICATIONS

Polastre, J. et al., "Versitile Low Power Media Access for Wireless Sensor Networks", SenSys'04, Nov. 3-5, 204, Baltimore, Maryland, USA, ACM 1-58113-879-2/04/0022.

"Chinese Application Serial No. 200580044118.3, Office Action mailed Mar. 20, 2009", 14 pgs.

Olan, Fan; "MAC Mechanism Performance Analysis and Improvement," IEEE 802.11, 9 pgs.

(Continued)

*Primary Examiner* — Khawar Iqbal

(74) *Attorney, Agent, or Firm* — John F. Travis

(57) ABSTRACT

Apparatus and systems, as well as methods and articles, may operate to enter an idle state of a wireless device for a selected amount of time responsive to a combined clear channel assessment indication.

6 Claims, 5 Drawing Sheets

(56) References Cited

U.S. PATENT DOCUMENTS

| | | |
|---|---|---|
| 2006/0030267 A1* | 2/2006 | Bhardwaj et al. ............ 455/63.1 |
| 2006/0068837 A1 | 3/2006 | Malone |
| 2006/0068854 A1* | 3/2006 | Sandhu .................... 455/574 |
| 2006/0133304 A1* | 6/2006 | Tanach ..................... 370/311 |
| 2007/0019665 A1* | 1/2007 | Benveniste ................. 370/445 |
| 2009/0170459 A1* | 7/2009 | Karaoguz ................... 455/231 |
| 2009/0175237 A1* | 7/2009 | Husted et al. ............... 370/329 |
| 2009/0257362 A1 | 10/2009 | Marinier et al. |
| 2009/0271864 A1 | 10/2009 | Dietrich et al. |
| 2010/0266064 A1* | 10/2010 | Hansen et al. ............... 375/267 |

FOREIGN PATENT DOCUMENTS

| | | |
|---|---|---|
| WO | 0205490 | 1/2002 |
| WO | 2006/069281 A2 | 6/2006 |
| WO | 2006006928 | 6/2006 |
| WO | 2006/069281 A3 | 8/2006 |
| WO | 2006/069281 A8 | 11/2006 |

OTHER PUBLICATIONS

"United Kingdom Application No. 0711669.2, Office Action mailed Oct. 24, 2008", 1 pg.

International Search Report received for PCT Patent Application No. PCT/US2005/046696, mailed Jun. 7, 2006.

"German Application No. 112005003205.1 , Office Action mailed Mar. 15, 2012", 11 pgs.

"Chinese Application Serial No. 201010161606.5, Office Action mailed Jan. 26, 2011", 10 pgs.

"Chinese Application Serial No. 201010161606.5, Office Action mailed Feb. 16, 2011", 4 pgs.

"Taiwan Application Serial No. 94145541, Office Action mailed Jun. 6, 2007", 5 pgs.

International Preliminary Examination Report received for PCT Patent Application No. PCT/US05/046696, mailed on Jul. 6, 2007, 6 pages.

* cited by examiner

IDLE STATE MANAGEMENT

CROSS-REFERENCE TO RELATED APPLICATION

This application is a continuation of U.S. patent application Ser. No. 11/018,561, filed on Dec. 21, 2004, and claims priority to that date for all subject matter which is hereby incorporated by reference in its entirety.

TECHNICAL FIELD

Various embodiments described herein relate to communications generally, including apparatus, systems, and methods used to save power while communicating various types of information.

BACKGROUND INFORMATION

The battery lifetime of personal communications devices may become increasingly important to consumers, especially with the use of various mobile applications, including "Voice-over-IP" (VoIP). Thus, quoted figures for standby battery lifetime, as well as use time (e.g., talk time), may become a distinguishing sales feature.

The Institute of Electrical and Electronic Engineers (IEEE) 802.11 standard includes a basic power saving mechanism, but its use may not permit some applications to operate properly due to latency requirements. VoIP presents an example of such circumstances. For example, during standby time periods, the regular power-saving mechanisms of 802.11 may be useful. However, the same mechanism may not be usable during the call itself because of the latency associated with it. Currently proposed improvements may require changes to both the access point (AP) involved, as well as to the consumer communication device, or station (STA).

For more information with respect to VoIP and the IEEE 802.11 standard, please refer to please refer to International Telecommunication Union (ITU) Standard H.323—Version 5 "Packet-based Multimedia Communications Systems" (July 2003) and "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments, respectively.

DETAILED DESCRIPTION

Various embodiments disclosed herein may address the challenge of saving power during wireless device communication activity by increasing the number and/or length of idle state time periods. For example, the nature of some IEEE 802.11 protocols encourage a STA to constantly listen to the medium unless operating in a low power state permitted by the AP and defined by the protocol. However, as will be shown below, there are circumstances when it may be possible to turn off various elements within the STA to save power, such as portions of the receive chain, even when the AP may not be aware that such activity is taking place.

Figure 1A:
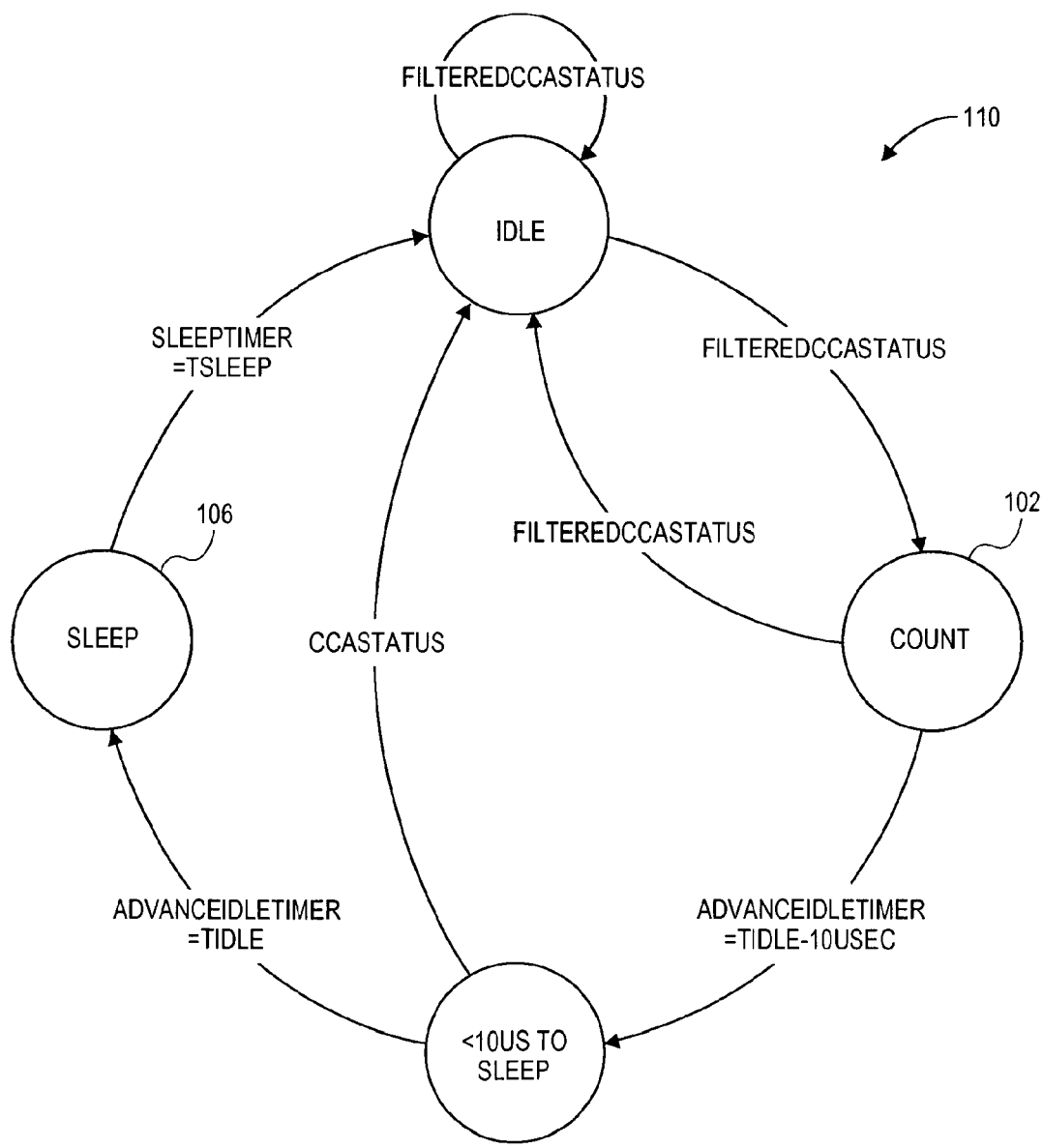
FIGS. 1A, 1B comprise a flow diagram of apparatus and system operational activity, as well as signal waveforms, respectively, according to various embodiments of the invention.
Figure 1B:
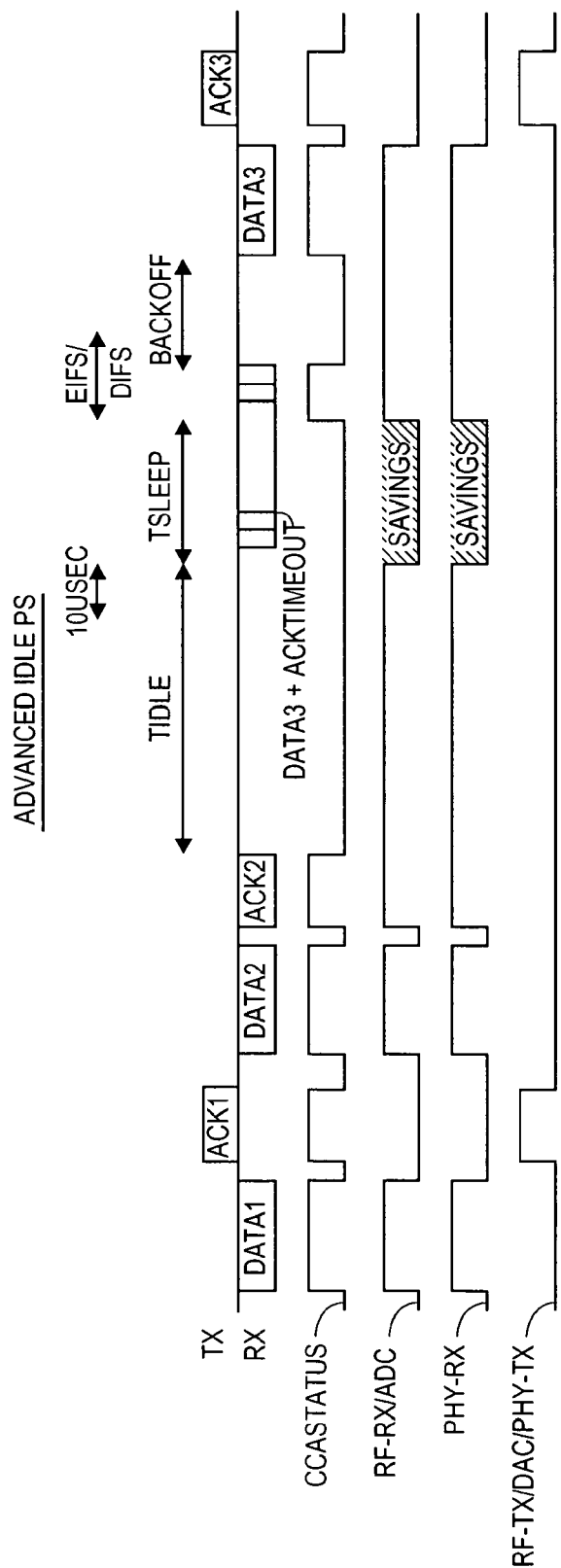

FIGS. 1A, 1B comprise a flow diagram of apparatus and system operational activity, as well as signal waveforms, respectively, according to various embodiments of the invention. In some embodiments, the assumption is made that an idle medium will tend to remain idle, at least for some selected amount of time. This assumption may be derived from IEEE 802.11 protocols that encourage a STA to avoid transmission for an EIFS (extended inter-frame space) time period after a bad CRC (cyclic redundancy check) frame is received, for example. Even if the assumption is invalid at some particular point in time, various embodiments may continue to operate such that overall performance is not substantially affected. It should be noted that while some embodiments may be described as primarily implemented using hardware, others using pure software and combinations of software and hardware are contemplated. For example, software may be used to provide dynamic control of various input parameters to the hardware.

In some embodiments, two timers 102, 106 and a finite state machine (FSM) 110 may be included in the apparatus and systems described. Thus, an AdvanceIdleTimer 102 may be used to count the time (e.g., Tidle) since the medium was last BUSY. This may be accomplished by monitoring a combined CCA (clear channel assessment) status indication CcaStatus, which may comprise an OR function of CCA indications provided by IEEE 802.11b and IEEE 802.11g PHY (physical) layers, as well as the CCA indication from and IEEE 802.11a PHY layer. Thus, the combined CCA status indication CcaStatus may comprise an OR function of any number (e.g., two or more) of CCA indications provided by a variety of physical layers.

Another indication that may be monitored is a filtered version of the combined CCA status indication, FilteredCcaStatus. In this case, the indication FilteredCcaStatus may comprise a filtered version of the combined CCA status indication CcaStatus that removes "glitches" or state transitions existing for some time less than a programmable value, such as less than about 10 microseconds, or some other value that may be set according to a particular usage model.

As soon as the AdvanceIdleTimer 102 reaches a selected Tidle threshold, it may be used to trigger an idle state having a sleep duration equal to a programmable Tsleep value counted by the SleepTimer 106, in which some portions of a mobile device (e.g., analog-to-digital converters, analog front end, etc.) are switched from an ON state to a SNOOZE state, while the digital PHY layer devices are disabled.

Using the filtered indication FilteredCcaStatus may reduce false alarms on CcaStatus that cause the AdvanceIdleTimer to restart. However, such filtering may permit placing a device in an idle or sleep state even though a frame is currently being received. In order to avoid this situation, the FSM 110 may include a "<10 usec to Sleep" state, where the reset to the AdvanceIdleTimer 102 changed from using the indication FilteredCcaStatus to using the indication CcaStatus.

To further describe the operation of the various embodiments disclosed herein, consider the parameters Tsleep and Tidle shown in FIG. 1B. Tsleep may be defined as the time a device will not be listening to the medium even though it does not transmit. Tidle may be defined as the time the device should stay awake and assess the medium to decide on moving to a SNOOZE or idle state. This may be especially useful at the time immediately after the device just awakened from the idle state.

To assist in calculating Tsleep, several considerations may be observed. For example, where the device is asleep while a frame directed to it is transmitted over the air, the device should wake up in time to receive the following retransmission. Further, worst case transmission rates may assume the existence of 64 byte, 54 Mbps frames. This equates to a 32 μsec frame time period. Finally, retransmission should occur after an ACK (acknowledge signal) timeout period plus a backoff period of about 0 to 63 time slots. For simplicity, a backoff of 16 slots will be selected herein to achieve a higher probability of waking up in time for retransmission. A subtotal, comprising a combination of a short inter-frame space (SIFS) time, a distributed inter-frame space (DIFS) time, an acknowledge (ACK) time, a slot time, and a portion of a frame length may be calculated as:

$$10(SIFS)+24(ACK)+2*6(signal extension)+28(DIFS)+16\times 9(SlotTime)=218 \, u \, sec$$

where signalextension is a 6 μsec suffix to an OFDM (orthogonal frequency-division multiplexing) frame.

Thus, Tsleep may be determined as: $T_{sleep}=32$ μsec+218 μsec=250 μsec

It should be noted that if the STA goes to sleep right when a frame is starting to be received, there is a probability of waking up in time to receive the retransmission given by: $P_{retrans-receiv}=(64-16)/64=0.75$. There is also a probability that the first retransmission will not be received, but the second retransmission will be received, since the indication of CcaStatus on the missed frame can be used to reset AdvanceIdleTimer, viz: $P_{retrans-not-receive}=0.25$.

To assist in calculating Tidle, additional considerations may be observed. For example, during sleep or idle time a unicast frame may be transmitted. Therefore, after waking up the device should stay awake at least until transmission of the next frame begins, so that CcaStatus is asserted. Designing for the worst case, a retransmission backoff of 64 slots may be assumed, and a time period equal to a function of a SIFS time, an ACK time, and a DIFS time may be added, as if the previous transmission ended right before wakeup occurs. Therefore, the "awake" time, or Tidle, may be calculated as:

$$T_{idle}=10(SIFS)+24(Ack)+2*6(signal-ext)+28(DIFS)+64\times 9(SlotTime)=650 \, u \, sec$$

In some embodiments, implementation may result in saving power when a medium is idle without resorting to use of an explicit IEEE 802.11 power saving mode. Further, some implementations may occur without real time involvement of firmware, such as when firmware is used to control the timing parameters and/or use of the various embodiments responsive to specific operational conditions.

Tidle and Tsleep may also be optimized to fit various usage models. While it may happen that some portions of a device receiver chain are asleep when traffic arrives, the penalty will likely only be a small delay in access latency by the device. If the medium is idle, the condition may only affect the first frame in a series of frames—perhaps so as not even to be noticed by the user. If it is assumed that frames are sent while the device is asleep, such that EIFS time periods are counted and new transmissions from the host are postponed, there may also be no noticeable penalty, since there may be a low transmit rate, or many queued transmit frames, such that the receiver chain will not be put to sleep. Even if the usage model doesn't make use of retransmission, the features of various embodiments may simply be disabled. Thus, many embodiments may be realized.

Figure 2:
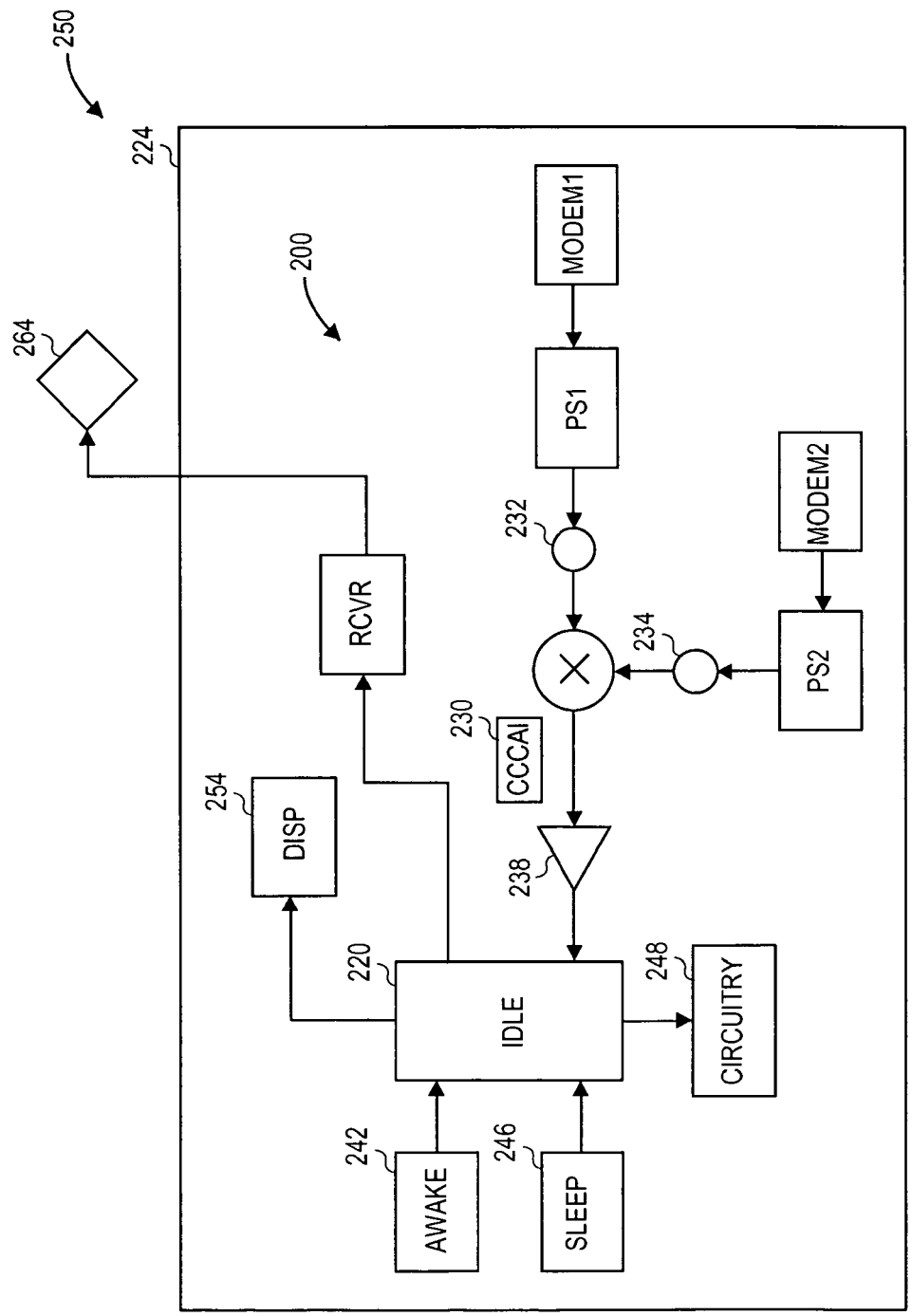
FIG. 2 is a block diagram illustrating apparatus and systems according to various embodiments of the invention.

For example, FIG. 2 is a block diagram illustrating apparatus 200 and systems 250 according to various embodiments of the invention, each of which may operate in the manner described above. The apparatus 200 may include an idle indication module 220 to initiate entry into an idle state of a wireless device 224 for a selected amount of time (Tsleep) responsive to a combined CCA indication (CCCAI) 230. The wireless device 224 may comprise a number of components, such as a cellular telephone, a personal communicator, a personal digital assistant, a laptop or notebook computer, and any combination of these.

The apparatus 200 may include multiple nodes to receive various protocol status indications. For example, the apparatus 200 may include a first node 232 to receive a first physical layer protocol status PS1 and a second node 234 to receive a second physical layer protocol status PS2. The first physical layer protocol status PS1 may be combined with the second physical layer protocol status PS2 to provide the CCCAI 230.

The physical layer protocol status indications may comprise any number of mechanisms. For example, the first physical layer protocol status PS1 may comprise a first IEEE 802.11 protocol CCA status (e.g., IEEE 802.11a CCA status), and the second physical layer protocol status PS2 may comprise a second IEEE 802.11 protocol CCA status (e.g., IEEE 802.11b CCA status).

The CCCAI 230 may be produced via any number of combination devices, including Boolean combinations. Thus, the CCCAI 230 may comprise an OR operation of a CCA status of a first physical layer protocol (e.g., IEEE 802.11b CCA status) and a CCA status of a second physical layer protocol (e.g., IEEE 802.11g CCA status). It should be noted that although only two physical layer protocol status indications PS1 and PS2 are shown in FIG. 2, any number of physical layer protocol CCA status indications (e.g., two or more) may be combined to provide the CCCAI 230. The apparatus 200 may include one or more filters 238 to remove glitches of greater than a selected time period (e.g., about 10 μsec, as noted above) from the CCCAI 230.

In some embodiments, the apparatus 200 may include an awake module 242 to determine an awake time to refrain from entering the idle state (e.g., Tidle). The awake time may comprise a function of one or more of a SIFS time, a DIFS time, an ACK time, a slot time, and a portion of a frame length. The apparatus 200 may also include a sleep module 246 to determine a sleep time to remain in the idle state (e.g., Tsleep). The sleep time may also comprise of one or more of a SIFS time, a DIFS time, an ACK time, a slot time, and a portion of a frame length. The idle state command may be initiated to the entire device 224, or to selected circuitry 248. Other embodiments may be realized.

For example, a system 250 may include one or more apparatus 200, described previously. The system 250 may also include one or more modems MODEM1, MODEM2 to provide one or more corresponding CCA status indications PS1, PS2, as well as a display 254 to couple to the idle indication module 220. The display 254 may comprise a flat panel display, solid-state display, a cathode-ray tube display, a holographic display, among others. Some systems 250 may include a receive chain 260, including a receiver, to couple to the idle indication module 220, as well as to an antenna 264. The antenna 264 may comprise a number of types, including patch, omnidirectional, beam, monopole, dipole, and/or log periodic antennas, among others.

The timers 102, 106; FSM 110; apparatus 200; idle indication module 220; wireless device 224; CCCAI 230; nodes 232, 234; protocol status PS1, PS2; filter 238; awake module 242; sleep module 246; circuitry 248; system 250; display 254; receive chain 260; antenna 264; CCA status indication CcaStatus; filtered CCCAI FilteredCcaStatus; idle time Tidle; and sleep time Tsleep may all be characterized as "modules" herein.

Such modules may include hardware circuitry, processors, memory circuits, software program modules and objects, firmware, and/or combinations thereof, as desired by the architect of the apparatus 200 and systems 250, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments can be used in applications other than transmission and reception of television signals, and thus, various embodiments are not to be so limited. The illustrations of apparatus 200 and systems 250 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments include a number of methods.

Figure 3:
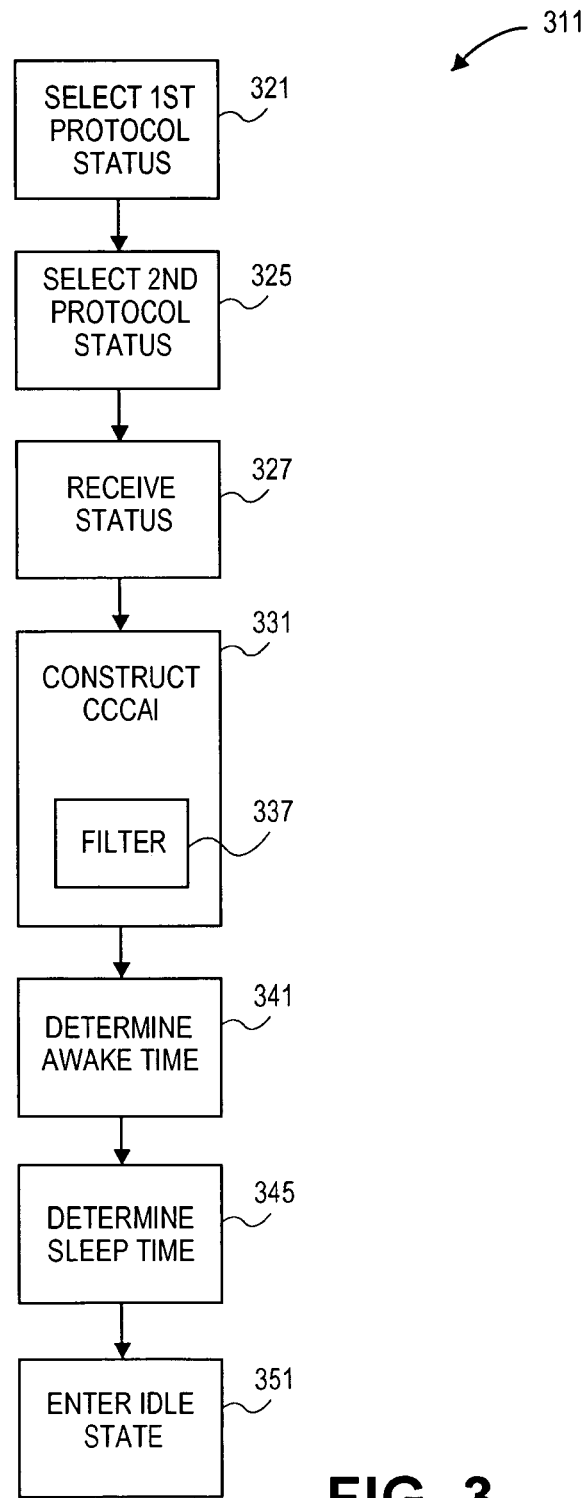
FIG. 3 is a flow diagram illustrating several methods according to various embodiments of the invention.

For example, FIG. 3 is a flow diagram illustrating several methods according to various embodiments of the invention. For example, a method 311 may (optionally) begin at block 321 with selecting a first protocol status, such as a first physical layer protocol status. The method 311 may continue at block 325 with selecting a second protocol status, such as a second physical layer protocol status. For example, the first physical layer protocol status may be selected from a first IEEE 802.11 protocol CCA status, and the second physical layer protocol may be selected from a second IEEE 802.11 protocol CCA status (e.g., an IEEE 802.11b and IEEE 802.11g CCA status, respectively). The first and second status may be received at block 327, perhaps as provided by one or more modems.

In some embodiments, the method 311 may include constructing a CCCAI at block 331 comprising a function of the first physical layer protocol status and a second physical layer protocol status. Additional physical layer protocol status indications may be used to construct the CCCAI. For example, the CCCAI may be provided as a function, such as an OR operation, of a first physical layer protocol CCA status and a second physical layer protocol CCA status (and a third physical layer protocol CCA status, and so on, if desired). Thus, the method 311 may also include combining a first physical layer protocol status, a second physical layer protocol status, and a third physical layer protocol status to provide the CCCAI at block 331. The method 311 may also include filtering the CCCAI to remove glitches of greater than a selected time period (e.g., about 10 μsec, although any other time period may be selected according a desired usage model) at block 337.

In some embodiments, the method 311 may include determining an awake time (e.g., Tidle) to refrain from entering the idle state at block 341, perhaps comprising a function of at least one of a SIFS time, a DIFS time, an ACK time, a slot time, and a portion of a frame length. The method 311 may also include determining a sleep time (e.g., Tsleep) to remain in the idle state at block 345, also comprising a function of at least one of a SIFS time, a DIFS time, an ACK time, a slot time, and a portion of a frame length. The method 311 may (optionally) conclude with entering an idle state of a wireless device for a selected amount of time (e.g., Tsleep) responsive to the CCCAI at block 351.

It should be noted that the methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 4:
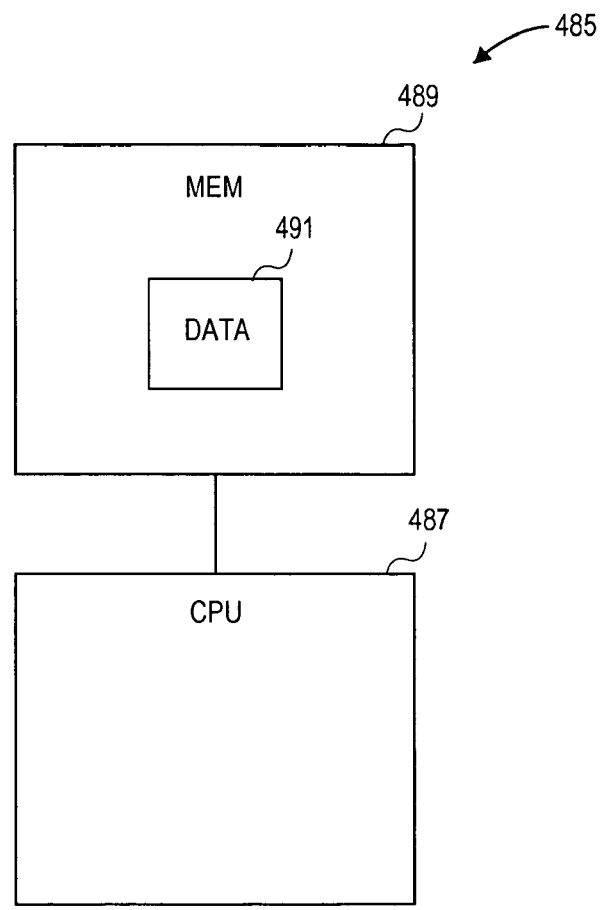
FIG. 4 is a block diagram of an article according to various embodiments of the invention.

For example, FIG. 4 is a block diagram of an article 485 according to various embodiments of the invention. Examples of such embodiments may comprise a computer, a memory system, a magnetic or optical disk, some other storage device, and/or any type of electronic device or system. The article 485 may include a processor 487 coupled to a machine-accessible medium such as a memory 489 (e.g., a memory including an electrical, optical, or electromagnetic conductor) having associated information 491 (e.g., computer program instructions and/or data), which, when accessed, results in a machine (e.g., the processor 487) performing such actions as entering an idle state of a wireless device for a selected amount of time responsive to a CCCAI, which may comprise a function of a first physical layer protocol status and a second physical layer protocol status. A variety of status indications may be used to form the combination, as noted above. For example, the first physical layer protocol status may comprise an 802.11b protocol status, and the second physical layer protocol status may comprise one of an 802.11g protocol status and an 802.11a protocol status.

Other actions may include receiving the first physical layer protocol status and the second physical layer protocol status from one or more modems. Further actions may include determining one of an awake time to refrain from entering the idle state, and a sleep time to remain in the idle state, comprising a function of at least one of a SIFS time, a DIFS time, an ACK time, a slot time, and a portion of a frame length.

Implementing the apparatus, systems, and methods disclosed herein may increase battery lifetime for a variety of portable wireless devices. Power consumption may be improved over more conventional methods, without mandating changes to hardware operations.

Although the inventive concept may be discussed in the exemplary context of an 802.xx implementation (e.g., 802.11a, 802.11b, 802.11g, 802.11 HT, 802.16, etc.), the claims are not to be so limited. Indeed, embodiments of the present invention may well be implemented as part of any wired and/or wireless system Examples may also include embodiments comprising multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A wireless communications apparatus to communicate in a wireless communications network, including
    a receiving chain for receiving a wireless signal;
    a first modem for producing a first clear channel assessment indicator that indicates a first physical layer protocol status;
    a second modem for producing a second clear channel assessment indicator that indicates a second physical layer protocol status;
    a combination device for producing a combined clear channel assessment indicator from the first and second clear channel assessment indicators, wherein the combined clear channel assessment indictor is active if at least one of the first and second clear channel indicators is active and is not active if neither of the first and second clear channel indicators is active; and
    an idle indication module containing hardware, the idle indication module to cause the wireless communications apparatus to refrain from transmitting if the combined clear channel assessment indicator is active; and
    a filter for filtering the combined clear channel assessment indicator to remove glitches of more than a selected time period;
    wherein said combined clear channel assessment indicator is produced by performing an OR operation between the first and second clear channel assessment indicators.

2. The apparatus of claim 1, further comprising
    at least one antenna for said receiving and transmitting.

3. A method of communicating in a wireless communications network, including
    performing operations in a wireless communications device, the operations comprising:
    receiving a wireless signal;
    producing a first clear channel assessment indicator that indicates a first physical layer protocol status;
    producing a second clear channel assessment indicator that indicates a second physical layer protocol status;
    producing a combined clear channel assessment indicator from the first and second clear channel assessment indicators, wherein the combined clear channel assessment indictor is active if at least one of the first and second clear channel indicators is active and is not active if neither of the first and second clear channel indicators is active;
    filtering the combined clear channel assessment indicator to remove glitches of more than a selected time period:
    refraining from transmitting if the combined clear channel assessment indicator is active; and
    triggering the idle state if both the first and second clear channel assessment indicators indicate no activity on the wireless communications channel for a certain amount of time.

4. The method of claim 3, wherein said producing the combined clear channel assessment indicator comprises
    determining if at least one of the first and second clear channel assessment indicators indicates activity on the wireless communications channel.

5. A communications device for communicating in a wireless communications network, the device containing means to:
    receive a wireless signal;
    produce a first clear channel assessment indicator that indicates a first physical layer protocol status;
    produce a second clear channel assessment indicator that indicates a second physical layer protocol status;

produce a combined clear channel assessment indicator from the first and second clear channel assessment indicators, wherein the combined clear channel assessment indictor is active if at least one of the first and second clear channel indicators is active and is not active if neither of the first and second clear channel indicators is active;

filter the combined clear channel assessment indicator to remove glitches of more than a selected time period;

refrain from transmitting if the combined clear channel assessment indicator is active; and trigger the idle state if both the first and second clear channel assessment indicators indicate no activity on the wireless communications channel for a certain amount of time.

6. The device of claim 5, wherein the means to produce the combined clear channel assessment indicator comprise means to determine if at least one of the first and second clear channel assessment indicators indicates activity on the wireless communications channel.

* * * * *